(12) United States Patent
Bergman et al.

(10) Patent No.: US 9,545,115 B2
(45) Date of Patent: Jan. 17, 2017

(54) AUTOMATIC SKINNING DEVICE

(71) Applicant: MAREL MEAT PROCESSING INC., Des Moines, IA (US)

(72) Inventors: Matthew A. Bergman, Des Moines, IA (US); Stephen H. Cate, Johnston, IA (US); Joseph A. Gross, Bondurant, IA (US); Colin R. Hart, Ankeny, IA (US); William A. Johnson, Prairie City, IA (US); Ryan J. Rohe, Swan, IA (US)

(73) Assignee: Marvel Meat Processing Inc., Des Moines, IA (US)

( * ) Notice: Subject to any disclaimer, the term of this patent is extended or adjusted under 35 U.S.C. 154(b) by 0 days.

(21) Appl. No.: 15/075,271

(22) Filed: Mar. 21, 2016

(65) Prior Publication Data
US 2016/0309727 A1 Oct. 27, 2016

Related U.S. Application Data

(60) Provisional application No. 62/150,572, filed on Apr. 21, 2015.

(51) Int. Cl.
*A22C 21/00* (2006.01)
*A22B 5/16* (2006.01)
*A22C 25/17* (2006.01)

(52) U.S. Cl.
CPC *A22C 25/17* (2013.01); *A22B 5/16* (2013.01)

(58) Field of Classification Search
CPC ..... A22C 21/0092; A22C 17/12; A22C 25/17; A22B 5/166

USPC .......................................... 452/125, 127–130
See application file for complete search history.

(56) References Cited

U.S. PATENT DOCUMENTS

| | | |
|---|---|---|
| 378,039 A | 2/1888 | Campbell |
| 2,722,255 A | 11/1955 | Townsend |
| 2,738,545 A | 3/1956 | Stevenson et al. |
| 2,744,285 A | 5/1956 | Christiansen |
| 3,094,739 A | 6/1963 | Eriksen |
| 3,504,721 A | 4/1970 | Townsend |
| 3,542,105 A | 11/1970 | Townsend |
| 3,613,154 A | 10/1971 | Townsend |
| 3,667,521 A | 6/1972 | Beasley |
| 3,703,199 A | 11/1972 | Townsend |
| 3,892,010 A | 7/1975 | Bartels et al. |
| 4,203,179 A | 5/1980 | Braeger |
| 4,835,817 A | 6/1989 | Jurs |
| 5,197,916 A | 3/1993 | Orlando et al. |

(Continued)

FOREIGN PATENT DOCUMENTS

| | | |
|---|---|---|
| BE | 900019 A2 | 10/1984 |
| CN | 202750641 U | 2/2013 |

(Continued)

OTHER PUBLICATIONS

BE 900019—Filleting Corp PVBA—English Abstract.
(Continued)

*Primary Examiner* — Richard Price, Jr.
(74) *Attorney, Agent, or Firm* — Zarley Law Firm, P.L.C.

(57) ABSTRACT

An automatic skinning mechanism having an inlet conveyor, a take away conveyor, a skinning mechanism and a hold down mechanism that removes pressure form a food product as the skinning mechanism begins skinning food product.

20 Claims, 4 Drawing Sheets

(56) References Cited

U.S. PATENT DOCUMENTS

| | | | | |
|---|---|---|---|---|
| 5,236,323 | A | * | 8/1993 | Long .................. A22C 17/12 452/127 |
| 5,503,593 | A | | 4/1996 | Schill |
| 5,507,690 | A | * | 4/1996 | Eide .................. A22C 25/18 452/126 |
| 5,558,573 | A | | 9/1996 | Basile, II et al. |
| 6,213,863 | B1 | * | 4/2001 | Basile, II .............. A22B 5/166 452/125 |
| 6,244,950 | B1 | * | 6/2001 | Long .................. A22C 17/12 452/127 |
| 6,264,542 | B1 | | 7/2001 | Gasbarro |
| 8,753,177 | B2 | * | 6/2014 | Schroder .............. A22C 17/12 452/134 |
| 8,986,080 | B2 | * | 3/2015 | Black .................. A22B 5/166 452/150 |
| 2011/0124277 | A1 | | 5/2011 | Schwarz |

FOREIGN PATENT DOCUMENTS

| | | |
|---|---|---|
| DE | 4025600 A1 | 2/1992 |
| DE | 4322478 A1 | 1/1994 |
| DE | 19962440 A1 | 7/2001 |
| DK | 97979 A | 9/1980 |
| FR | 2544591 A1 | 10/1984 |
| GB | 1557952 | 12/1979 |
| GB | 2481137 A | 12/2011 |
| WO | 2012159832 A1 | 11/2012 |
| WO | 2013164861 A1 | 11/2013 |

OTHER PUBLICATIONS

CN 202750641—Nanjing Lvfan Aquatic Product Tech. Dev. Co. Ltd.—English Abstract.
DE 4025600—Nock, Ferdinand—English Abstract.
DE 4322478—Maja-Maschinenfabrik Hermann Schill GmbH—English Abstract.
DE 19962440—Nock, Ferdinand—English Abstract.
DK 97979—Nordischer Maschinenbau—English Abstract.
FR 2544591—Cresson, Christian.
International Searching Authority, "Notification of Transmittal of the International Search Report and The Written Opinion of the International Searching Authority", for PCT/US2016/026128.

* cited by examiner

AUTOMATIC SKINNING DEVICE

CROSS REFERENCE TO RELATED APPLICATION

This application claims the benefit of U.S. Provisional Application No. 62/150,572 filed Apr. 21, 2015, incorporated by reference herein.

BACKGROUND OF THE INVENTION

This invention is directed toward a device for removing skin from food products and more particularly to a device for removing skin from delicate food products such as fish.

In the meat processing industry it is desirable to remove the skin from meat parts such as fish fillets. Today this is done by using a knife or one of several conveyor fed skinning machines. Removing skin with a knife may cause lacerations or repetitive motion injuries. Also, skinning with a knife typically results in poor yields. Alternatively skinning machines often require feeding fish fillets tail first for good results. This requires turning fish either manually or automatically to accommodate tail first skinning which can result in damage to fish fillets. It is desirable that the fillets be fed head first in some cases to match the rest of the production line. Furthermore, it is desirable to have a machine that can easily or automatically be adjusted to accommodate demands for different skin thicknesses and/or product appearances.

Skinning machines fed with a conveying system normally require some type of opening bite at the skinning mechanism to start the meat product. To do this, most manufacturers take a thicker cut at the start of the skinning action by moving the skinning mechanism out and/or in and/or up and down. The other method used is to rotate the skinning mechanism around the product pulling roller and pinch the leading edge of the product. In all cases a hold-down mechanism is used to keep the product in place, during the skinning. Typical hold-down devices include individual rubber (nitrile) rollers, conveyor belts over the infeed conveyor and skinning mechanism or delrin rollers only over the skinning mechanism. Each of these methods can be disadvantageous. First, they may not provide even pressure over products that have varying shapes front to back or side to side. Second, these devices may cause damage and yield loss due to their aggressive nature. Particularly with fish such as salmon, constant pressure causes gapping or separation of the meat fibers. In fact, once the skinning has begun, holding down on the product is not necessary or desirable in some cases.

Therefore, an objective of the present invention is to provide a method and apparatus that can skin meat products such as fish fillets either head first or tail first with minimal skin patches.

Another objective of the present invention is to provide a hold-down system that provides sufficient pressure over the varying thicknesses of a single piece of product.

A still further objective of the present invention is to provide linking the skinning mechanism with the hold-down device to reduce adjustments.

A further objective of the present invention is to provide a skinning mechanism and a hold-down device where the hold-down device follows the position of the skinning mechanism as it moves in and out of its opening bite and/or height adjustments.

Another objective of the present invention is to remove all hold down pressure on the food product to ensure that damage to the product via hold down force is eliminated.

Yet another objective of the present invention is to adapt this method to either a dual lane or single lane skinning device.

Also, an objective other the present invention is to be easily and/or automatically adjusted for different skinning thicknesses or product requirements.

Finally, it is an objective of the present invention to use this method to eliminate skinning with a knife and the undesirable impact that knife skinning has on workers.

These and other objectives will be apparent to one of ordinary skill based upon the following written description, drawings and claims.

SUMMARY OF THE INVENTION

An automatic skinning device having an inlet conveyor, a hold down mechanism, a skinning mechanism, and a take away conveyor. The hold down mechanism is linked to the skinning mechanism such that the hold down mechanism follows the movement of the skinning mechanism during the opening bite and/or height adjustments and then removes pressure from a food product once the skinning of the food product begins.

The hold down mechanism includes at least one disc having a plurality of deformable curved spokes that extend from a central opening to an outer perimeter. The hold down mechanism provides a consistent pressure to a food product without the presence of a gap between the hold down mechanism and the food product.

DETAILED DESCRIPTION OF THE PREFERRED EMBODIMENT

Figure 1:
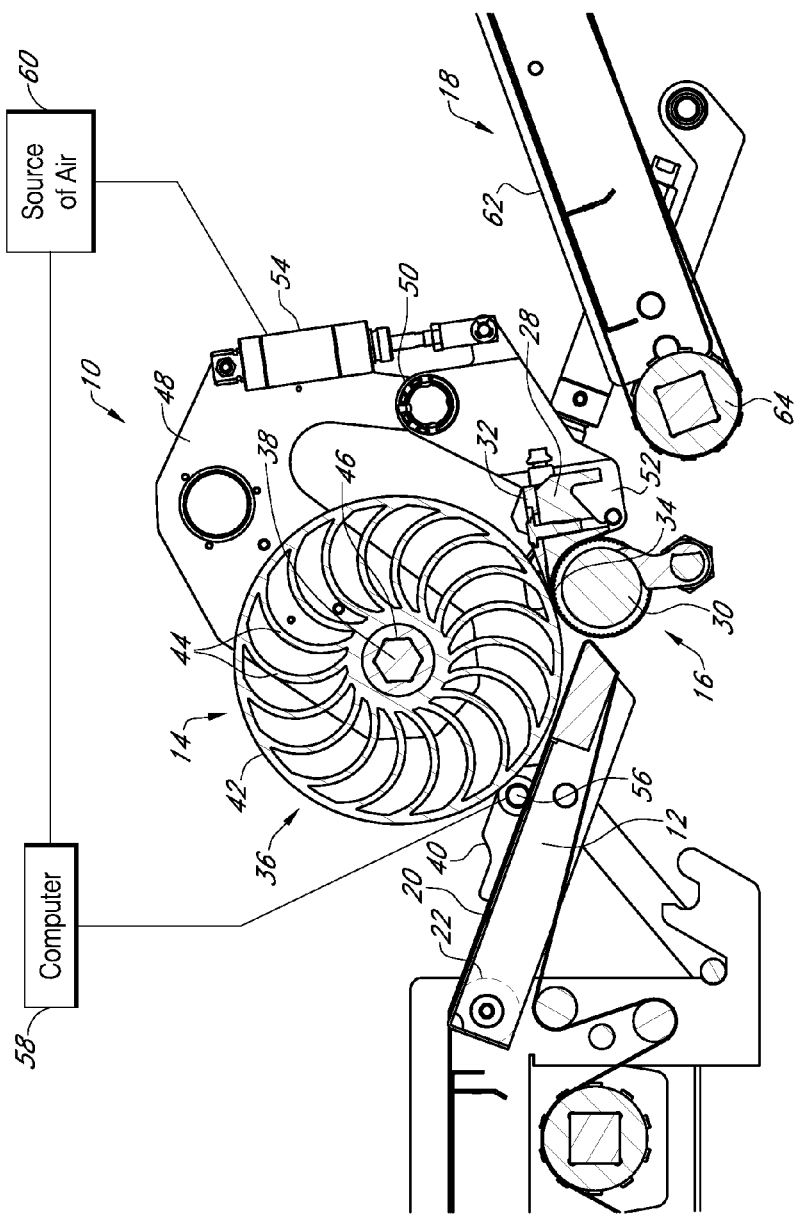
FIG. 1 is a side sectional view of an automatic skinning device.
Figure 2:
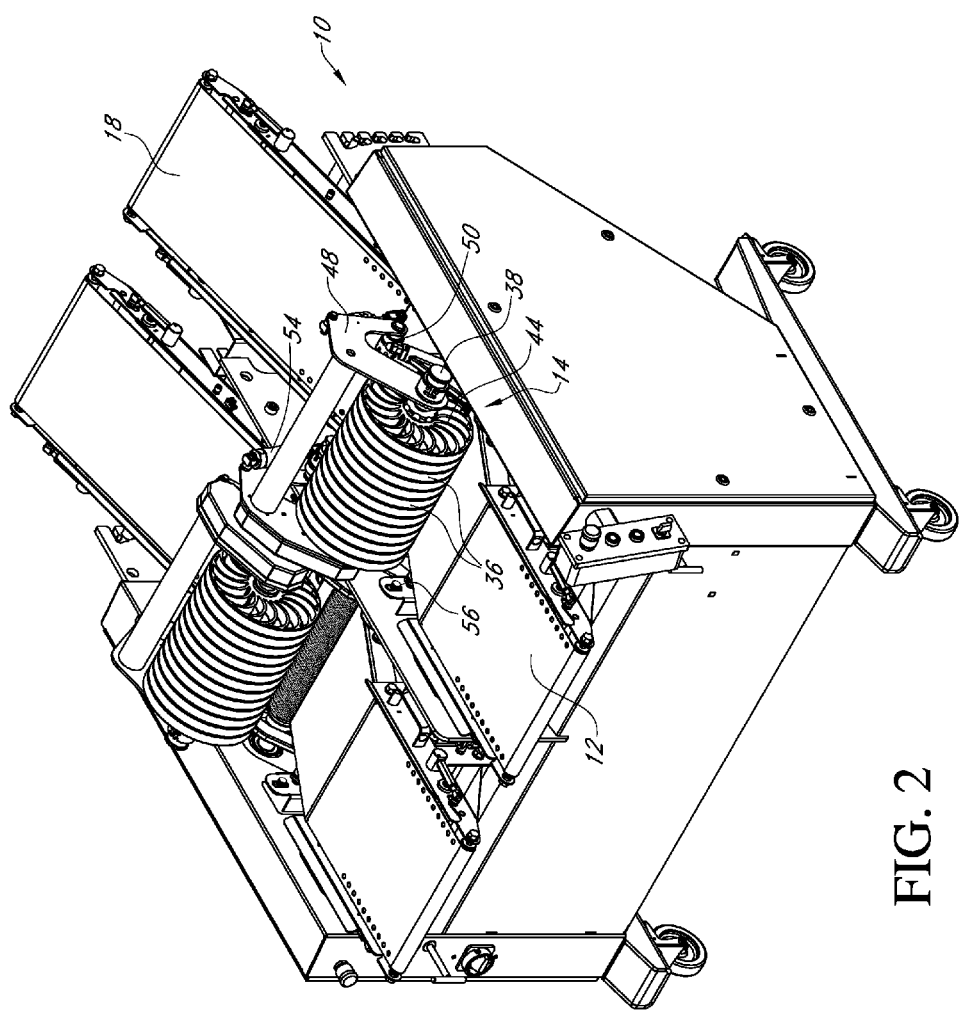
FIG. 2 is a perspective view of an automatic skinning device.
Figure 3:
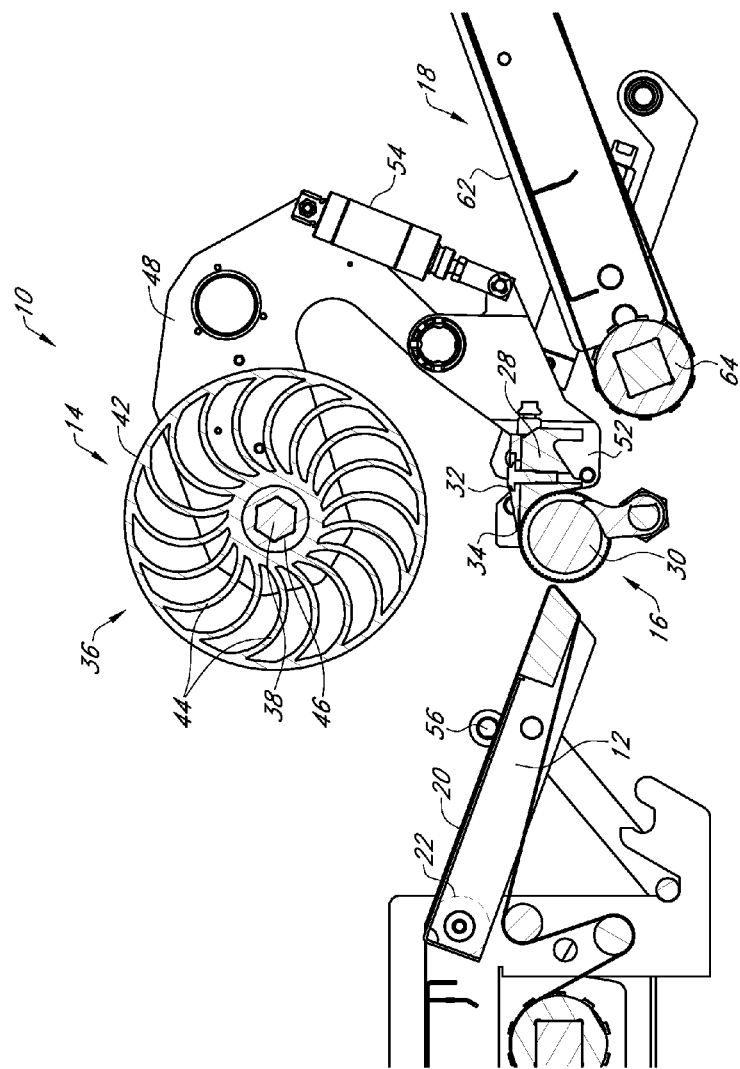
FIG. 3 is a side sectional view of an automatic skinning device.
Figure 4:
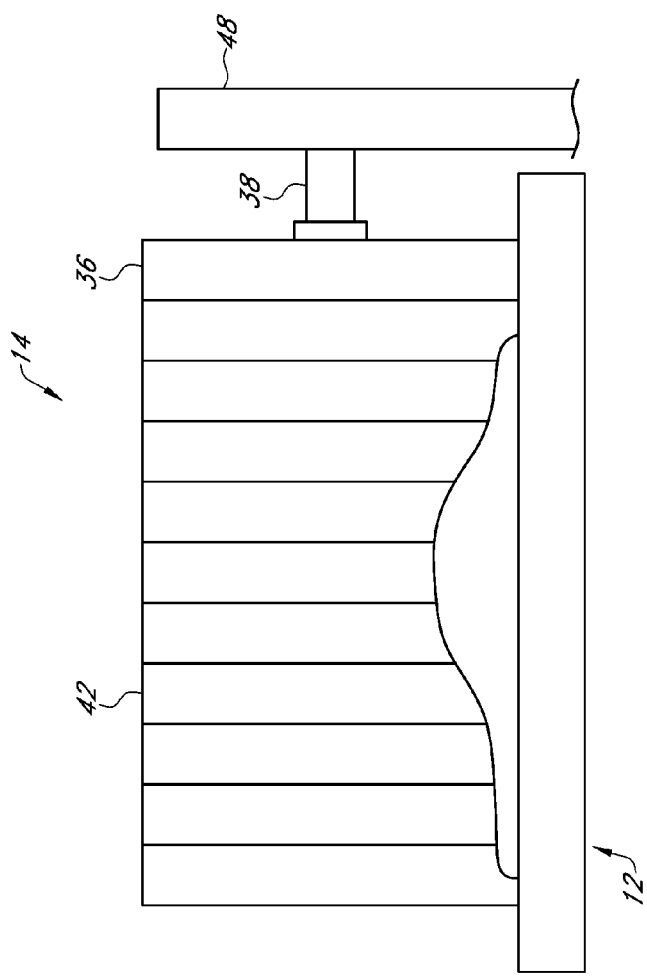
FIG. 4 is an end view of an automatic skinning device.

Referring to the Figures, an automatic skinning device 10 includes an infeed conveyor 12, a hold down mechanism 14, a skinning mechanism 16, and an exit or take-away conveyor 18. The infeed conveyor 12 has a continuous belt 20 mounted about rollers/pulleys 22

The skinning mechanism 16 has a shoe 28 with an arcuate surface that receives a tooth roll 30. A blade holder 32 is connected to the top of the shoe 28 and the blade holder 32 with an edge adjacent the outer circumference of the tooth roll 30.

Moveably positioned above a portion of the skinning mechanism is the hold down mechanism 14. The hold down mechanism 14 includes one, and preferably a plurality of discs 36, mounted to a rotatable shaft 38. The number of discs 36 used is determined by the width of a food product 40. The discs 36 preferably are made of a polymer material that has a durometer that varies based upon the type of food product 40. Each disc 36 has a continuous outer perimeter 42 and a plurality of arcuate spokes 44 that extend between the outer perimeter 42 and a central opening 46 of the disc 36. The discs 36 are closely spaced and/or engage one another such that when engaged by a food product 40 the discs deform to provide a consistent pressure to the food product 40 of varying thickness without gaps.

The rotatable shaft 38 is mounted to a support arm 48 that preferably extends upwardly and rearwardly of the discs 36 and then curves downwardly toward a connecting end 50. The connecting end 50 is pivotally connected to a plate 52 that is attached to the skinning mechanism 16. A pneumatic piston 54 is connected to and extends between the support arm 48 and plate 52.

Positioned adjacent the infeed conveyor 12, upstream of the hold down mechanism 14 and the skinning mechanism 16 is a sensor 56 that detects the presence of a food product 40. The sensor 56 is connected to a computer 58 that is also connected to a source of pressurized air 60 that extends or contracts piston 54.

Downstream of the skinning mechanism 16 and positioned to receive a skinned food product 40 is the exit or take-away conveyor 18. The take-away conveyor 18 has a continuous belt 62 mounted about rollers or pulleys 64.

In operation, the food product 40 is placed on the infeed conveyor 12 with the head portion ahead of the tail portion. As the infeed conveyor 12 transports the food product 40 toward the skinning mechanism 16, the food product 40 engages the hold down mechanism 14 which exerts a consistent pressure against the food product 40 without the presence of a gap between the hold down mechanism 14 and the food product 40. The hold down mechanism 14 and the skinning mechanism 16 are linked by a support arm 48 and a plate 52. As a result, the hold down mechanism 14 follows the position of the skinning mechanism 16 as the skinning mechanism 16 moves in and out of its opening bite.

Once the skinning mechanism 16 begins skinning the food product 40, the open bite moves from open to skinning position and the hold down mechanism 14 is raised removing all hold-down pressure from the food product 40 to ensure that damage to the food product is eliminated. To move the skinning mechanism and the hold down mechanism 14, a signal is sent from sensor 56 to computer 58. The computer 58 calculates when skinning begins based upon the speed of conveyor 12 and the distance of the sensor 56 from the skinning mechanism 16. The timing of the movement and opening bite can be altered to maximize yield based on a variable profile of a leading edge of the food product. This can be done either manually by an operator or electronically using electronic means of measurements. The computer 58 sends a signal actuating pressurized air to activate piston 54. The piston 54 retracts which causes support arm 48 to rotate upwardly in relation to plate 52 at connection end 50.

The food product 40 is engaged by the tooth roll 30 and the blade 34 separates the skin from the meat or lean portion. The skin falls below the skinning device to a hopper or conveyor while the lean portion is transported to the take away conveyor 18 for further processing. Once the food product 40 passes sensor 56 the computer activates cylinder 54 lowering the hold down mechanism 16. While a single lane device has been shown, two or more lanes are contemplated as well.

Thus, a skinning device has been disclosed that at the very least meets all the stated objectives.

What is claimed:

1. An automatic skinning device, comprising:
an infeed conveyor and a take away conveyor;
a skinning mechanism positioned between the inlet and takeaway conveyor; and
a hold down mechanism positioned above at least a portion of the inlet conveyor and the skinning mechanism wherein the hold down mechanism is configured to remove pressure from a food product as the skinning mechanism begins skinning the food product.

2. The skinning device of claim 1 wherein the hold down mechanism is configured to exert a consistent pressure against the food product without the presence of a gap between the hold down mechanism and the food product.

3. The skinning device of claim 1 wherein the hold down mechanism is linked to the skinning mechanism such that the hold down mechanism is configured to follow the position of the skinning mechanism as the skinning mechanism moves position.

4. The skinning device of claim 1 wherein the hold down mechanism is comprised of at least one disc having a deformable curved spoke that extends from a central opening of the disc to an outer perimeter of the disc.

5. The skinning device of claim 1 further comprising a sensor mounted adjacent the infeed conveyor that detects the presence of the food product and sends a signal to a computer that activates movement of the hold down mechanism and opening bite of the skinning mechanism.

6. The skinning device of claim 1 wherein the timing of the opening bite is altered to maximize yield based on a variable profile of a leading edge of the food product.

7. The skinning device of claim 6 wherein the timing of the opening bite is adjusted manually.

8. A method of skinning a food product, comprising the steps of:
placing the food product on an intake conveyor such that a head portion of the food product is ahead of a tail portion;
transporting the food product toward a skinning mechanism;
skinning the food product with the skinning mechanism; and
raising a hold down mechanism to remove all pressure from the food product when the skinning mechanism moves from an open bite position to a skinning position.

9. The method of claim 8 further comprising the step of providing consistent pressure to the food product having various thickness without gaps with the hold down mechanism.

10. The method of claim 8 comprising the step of calculating when skinning begins based upon the speed of the conveyor and the distance of the sensor from the skinning mechanism.

11. The method of claim 10 further comprising the step of adjusting when skinning begins to maximize yield.

12. An automatic skinning device, comprising:
an infeed conveyor positioned adjacent a skinning mechanism;
a hold down mechanism positioned above a portion of the skinning mechanism; and
wherein the hold down mechanism is linked to the skinning mechanism and the hold down mechanism is configured to follow the position of the skinning mechanism.

13. The skinning device of claim 12 further comprising the hold down mechanism having at least one disc having deformable spokes that extend between a continuous outer perimeter and a central opening.

14. The skinning device of claim 13 wherein when the plurality of discs engage a food product having a varying thickness the plurality of discs deform to provide a consistent pressure to the food product.

15. The skinning device of claim 12 wherein the hold down mechanism and skinning mechanism are linked by a support arm that extends between the hold down mechanism and connects to a plate attached to the skinning mechanism.

16. The skinning device of claim 15 wherein the support arm extends upwardly and rearwardly from the hold down mechanism and then curves downwardly towards a connecting end that connects to the plate attached to the skinning mechanism.

17. The skinning device of claim 15 further comprising a pneumatic piston connected to and extending between the support arm and plate, wherein the piston is configured to transition the skinning mechanism from an open bite position to a skinning position and transition the hold down mechanism from a hold position to a release position.

18. The skinning device of claim 17 wherein when the piston retracts the support arm rotates upwardly in relation to the plate.

19. The skinning device of claim 15 further comprising a sensor positioned adjacent the infeed conveyor and in communication with a computer, wherein when the sensor detects a food product passing the sensor the computer activates the piston connected to the support arm to transition the hold down mechanism to a hold position and the skinning mechanism to an open bite position.

20. The skinning device of claim 19 wherein the computer is configured to calculate when skinning begins based upon the speed of the infeed conveyor and the distance of the sensor from the skinning mechanism, such that when the computer determines that skinning has begun the computer activates the piston connected to the support arm to transition the hold down mechanism to a release position and the skinning mechanism to a skinning position.

* * * * *

UNITED STATES PATENT AND TRADEMARK OFFICE
CERTIFICATE OF CORRECTION

PATENT NO. : 9,545,115 B2  
APPLICATION NO. : 15/075271  
DATED : January 17, 2017  
INVENTOR(S) : Bergman et al.

Page 1 of 1

It is certified that error appears in the above-identified patent and that said Letters Patent is hereby corrected as shown below:

On the Title Page

Item [73]:  
DELETE: "MARVEL MEAT PROCESSING INC., Des Moines, IA (US)"  
INSERT: --MAREL MEAT PROCESSING INC., Des Moines, IA (US)--

Signed and Sealed this  
Twenty-sixth Day of September, 2017

Joseph Matal  
*Performing the Functions and Duties of the*  
*Under Secretary of Commerce for Intellectual Property and*  
*Director of the United States Patent and Trademark Office*